(12) United States Patent
Terada et al.

(10) Patent No.: US 7,160,362 B2
(45) Date of Patent: Jan. 9, 2007

(54) METHOD AND DEVICE FOR CLEANING AIR

(75) Inventors: Isao Terada, Yokohama (JP); Minoru Tanaka, Yokohama (JP); Yuji Matumura, Yokohama (JP); Sadao Kobayashi, Yokohama (JP); Naoki Mori, Tokyo (JP); Hiromu Itoh, Tokyo (JP); Yoshihide Wakayama, Tokyo (JP); Osamu Suenaga, Yamanashi (JP)

(73) Assignees: Nichias Co., Ltd., Tokyo (JP); Tokyo Electron Limited, Tokyo (JP); Taisei Corporation, Tokyo (JP)

( * ) Notice: Subject to any disclaimer, the term of this patent is extended or adjusted under 35 U.S.C. 154(b) by 68 days.

(21) Appl. No.: 10/482,332

(22) PCT Filed: Jun. 26, 2002

(86) PCT No.: PCT/JP02/06374

§ 371 (c)(1),
(2), (4) Date: Jul. 6, 2004

(87) PCT Pub. No.: WO03/001122

PCT Pub. Date: Jan. 3, 2003

(65) Prior Publication Data
US 2004/0237781 A1     Dec. 2, 2004

(30) Foreign Application Priority Data

Jun. 26, 2001  (JP) .............................. 2001-192517
Jun. 26, 2001  (JP) .............................. 2001-192518

(51) Int. Cl.
*F24F 7/06*  (2006.01)
*B01D 53/26*  (2006.01)

(52) U.S. Cl. ........................... 95/210; 95/223; 95/228; 96/290; 96/294; 34/74; 34/75; 34/80; 261/112.2

(58) Field of Classification Search ................ 95/210, 95/211, 223, 225, 228; 96/290, 294; 454/187; 34/73–76, 79, 80; 62/121, 304; 261/112.2
See application file for complete search history.

(56) References Cited

U.S. PATENT DOCUMENTS 3,791,102 A * 2/1974 Huntington .................. 95/191

(Continued)

FOREIGN PATENT DOCUMENTS

| EP | 0 773 412 A2 | 5/1997 |
|---|---|---|
| JP | 52-22944 | 2/1979 |
| JP | 63-270521 | 11/1988 |
| JP | 5-118596 | 5/1993 |
| JP | 7-60044 | 3/1995 |
| JP | 11-207124 | 8/1999 |
| WO | 99/66136 | 12/1999 |

OTHER PUBLICATIONS

Derwent Publications, AN 1996-374411, XP-002374900, JP 08-178350, Jul. 12, 1996.

*Primary Examiner*—Frank M. Lawrence
(74) *Attorney, Agent, or Firm*—Oblon, Spivak, McClelland, Maier & Neustadt, P.C.

(57) ABSTRACT

A method of cleaning air, including a humidifying operation for humidifying the air containing chemical contaminants by a humidifier and taking a part of the gaseous contaminants in the air into excessive moisture to remove the contaminants from the air, and a dehumidifying operation for dehumidifying the humidified air by a condenser and taking the gaseous chemical contaminants remaining, without being removed, in the humidifying operation into condensed water for removal. By using an oblique honeycomb having both front and rear faces and both upper and lower faces disposed in open state, air is led from the front opening part of the oblique honeycomb and water is fed from the upper opening part thereof to one or both of the humidifier and condenser.

17 Claims, 2 Drawing Sheets

U.S. PATENT DOCUMENTS

| | | | |
|---|---|---|---|
| 3,862,280 A * | 1/1975 | Polovina | 261/112.2 |
| 4,031,180 A * | 6/1977 | Bohanon | 261/106 |
| 4,429,735 A | 2/1984 | Nomaguchi et al. | |
| 4,670,197 A * | 6/1987 | Stackhouse | 261/112.2 |
| 5,143,658 A * | 9/1992 | Thomas | 261/112.2 |
| 5,271,755 A * | 12/1993 | Dietl | 65/42 |
| 5,320,651 A * | 6/1994 | Drummond | 96/356 |
| 5,531,801 A | 7/1996 | Sewell et al. | |
| 5,620,503 A * | 4/1997 | Miller et al. | 95/211 |
| 5,890,886 A * | 4/1999 | Doker et al. | 431/328 |
| 6,055,824 A * | 5/2000 | Kuma et al. | 62/314 |
| 6,748,751 B1 * | 6/2004 | Ohmi et al. | 62/121 |

* cited by examiner

METHOD AND DEVICE FOR CLEANING AIR

BACKGROUND OF THE INVENTION

1. Technical Field

The present invention relates to a method of cleaning air for purifying air by removing chemical pollutants in the air by washing the air with water and to a device used for the method. More particularly, the present invention relates to a method of cleaning air for purifying air to be supplied to a clean room in facilities for manufacturing semiconductors and liquid crystal devices, pharmaceutical factories, life science-related facilities, and the like and to the air cleaning device used for the method.

2. Background Art

In addition to particulate pollutants that have conventionally been the main target for air purification in facilities for manufacturing semiconductors and liquid crystal devices, pharmaceutical factories, life science-related facilities, and the like, elimination of gaseous chemical pollutants has been desired to improve the product yield and product quality. Such chemical pollutants include inorganic metal element such as sodium, potassium, calcium, and boron, anions such as fluorine ion, chloride ion, nitric acid ion, nitrous acid ion, sulfuric acid ion, sulfurous acid ion, and cations such as ammonium ion. Although conventional particulate pollutants can be removed using a dust filter such as a ULPA filter, these chemical pollutants cannot be removed using the ULPA filter.

For this reason, chemical pollutants in the air have conventionally been removed by a method utilizing shower of water drops called water shower or a method of using a chemical filter that can remove chemical components by adsorption. In the method of using the water shower, chemical pollutants are removed by spraying water to the air containing the chemical pollutants.

However, the method of using water shower exhibits only a low efficiency of chemical pollutant removal due to a poor contact efficiency of the air to be processed and water. For this reason, a humidifying means including a water shower device requires a length as large as several meters. In addition to the large space required for the facility, a large pressure loss has been a problem. Expensive deionized water used as shower water is another problem in the water shower method. A large amount of water increases the cost. Recycling deionized water which is a customarily employed way of processing for reducing cost results in a problem of releasing and redistributing once-adsorbed chemical pollutants. The method of using the chemical filter has also a problem of high cost due to the need for an expensive chemical filter which has a limited life of adsorption capability.

Accordingly, an object of the present invention is to provide an air processing method that can remove chemical pollutants in the air with high efficiency and a low cost. Another object of the present invention is to provide an air processing device that is compact, exhibits a reduced pressure loss, and is inexpensive.

DISCLOSURE OF THE INVENTION

In this situation, the present inventor has conducted extensive studies and have found that if an oblique honeycomb is used for either or both the humidifying means and condensing means, the air is introduced from a front opening of the oblique honeycomb, water is introduced from an upper opening, and the air and water introduced into the oblique honeycomb can be caused to efficiently contact each other, whereby the humidity of the air in the humidifying means can be efficiently increased and, in the condensing means, gaseous chemical pollutants can be efficiently adsorbed in the condensing water and can be removed. This finding has led to the completion of the present invention.

Specifically, the present invention provides a method of cleaning air comprising a humidifying step of using a oblique honeycomb arranged with openings on the front and rear surfaces and on the upper and lower surfaces as a humidifying means, wherein air containing chemical pollutants is supplied from the front opening and water is supplied from the upper opening to the oblique honeycomb to humidify the air to a prescribed humidity and at least a part of the chemical pollutants in the air is adsorbed into excess water, thereby removing the chemical pollutants.

The present invention also provides a method of cleaning air comprising a dehumidifying step of using a oblique honeycomb arranged with openings on the front and rear surfaces and on the upper and lower surfaces as a condensing means, wherein air containing chemical pollutants is supplied from the front opening and water is supplied from the upper opening to the oblique honeycomb to dehumidify the air to a prescribed humidity and adsorb the chemical pollutants in the air into condensed water, thereby removing the chemical pollutants.

The present invention further provides a method of cleaning air comprising a humidifying step of using a front oblique honeycomb arranged with openings on the front and rear surfaces and on the upper and lower surfaces as a humidifying means, wherein air containing chemical pollutants is supplied from the front opening and water is supplied from the upper opening to the oblique honeycomb to humidify the air to a prescribed humidity and a part of the chemical pollutants in the air is adsorbed into excess water, thereby removing the chemical pollutants from the air, and a dehumidifying step of using a rear oblique honeycomb arranged with openings on the front and rear surfaces and on the upper and lower surfaces and maintained at a temperature lower than the temperature of the front oblique honeycomb as a condensing means, wherein the air humidified in the humidifying step is introduced from the front opening and water is supplied from the upper opening to the rear oblique honeycomb to dehumidify the humidified air and adsorb the chemical pollutants remaining without being removed in the humidifying step into the condensed water, thereby removing the chemical pollutants.

The present invention additionally provides a method of cleaning air comprising a humidifying step of using a oblique honeycomb arranged with openings on the front and rear surfaces and on the upper and lower surfaces as a humidifying means, wherein air containing chemical pollutants is supplied from the front opening and water is supplied from the upper opening to the oblique honeycomb to humidify the air to a prescribed humidity and adsorb at least a part of the chemical pollutants in the air into excess water, thereby removing the chemical pollutants, and a dehumidifying step of dehumidifying the air humidified in the humidifying step to a prescribed humidity using a condensing means and adsorbing the chemical pollutants remaining without being removed in the humidifying step into the condensed water, thereby removing the chemical pollutants.

The present invention further provides a method of cleaning air comprising a humidifying step of humidifying the air to a prescribed humidity by using a humidifying means and adsorbing a part of the chemical pollutants in the air into excess water, thereby removing the chemical pollutants from the air, and a dehumidifying step of using an oblique honeycomb arranged with openings on the front and rear surfaces and on the upper and lower surfaces and maintained at a temperature lower than the temperature of the humidifying step as a condensing means, wherein the air humidified in the humidifying means is supplied from the front opening and water is supplied from the upper opening of the oblique honeycomb to dehumidifying the air humidified by the humidifying means to a prescribed humidity using the condensing means and adsorbing the chemical pollutants remaining without being removed in the humidifying step into the condensed water, thereby removing the chemical pollutants.

The present invention additionally provides a method of cleaning air comprising providing a oblique honeycomb arranged with openings on the front and rear surfaces and on the upper and lower surfaces to provide air from the front opening and water from the upper opening, a front section of the oblique honeycomb being used as a humidifying section to humidify the air to a prescribed humidity and the rear section of the oblique honeycomb being used as a condensing section to dehumidify the air to a prescribed humidity and obtain condensed water, the method comprising a humidifying step of humidifying the air containing chemical pollutants and adsorbing a part of the chemical pollutants in the air into excess water in the humidifying section, thereby removing the chemical pollutants from the air, and a dehumidifying step of dehumidifying the air humidified in the humidifying step and adsorbing the chemical pollutants remaining without being removed in the humidifying step into the condensed water in the condensing section, thereby removing the chemical pollutants.

The present invention also provides an air cleaning device having a humidifying section comprising a first air inlet port, a first water supply means, a humidifying means to humidify air introduced from the first air inlet port using water supplied by the first water supply means, a first air discharge port to discharge the humidified air, and a first water discharge means to discharge water from the system and a condensing section comprising a second air inlet port provided linked with the first air inlet port, a second water supply means, a condensing means to condense water in the air introduced from the second air inlet port using water supplied by the second water supply means, a second air discharge port to discharge the air after condensation, and a second water discharge means to discharge condensed water from the system, wherein the humidifying means and condensing means are respectively composed of a oblique honeycomb with openings on the front and rear surfaces and on the upper and lower surfaces, each oblique honeycomb being arranged so that the front surface respectively faces the side of the first air inlet port or the second air inlet port, and the introduced air passes through each oblique honeycomb, and the first water supply means and the second water supply means are installed above the respective oblique honeycomb.

The present invention also provides an air cleaning device having a humidifying section comprising a first air inlet port, a first water supply means, a humidifying means to humidify air introduced from the first air inlet port using water supplied by the first water supply means, a first air discharge port to discharge the humidified air, and a first water discharge means to discharge water from the system, wherein the humidifying means is composed of a oblique honeycomb with openings on the front and rear surfaces and on the upper and lower surfaces, arranged so that the front surface faces the side of the first air inlet port and the introduced air passes through the oblique honeycomb, and the first water supply means is installed above the oblique honeycomb.

The present invention lastly provides an air cleaning device having a humidifying section comprising a second air inlet port, a second water supply means, a condensing means to condense water in the air supplied from the second air inlet port using water supplied by the second water supply means, a second air discharge port to discharge the air after condensation, and a second water discharge means to discharge condensed water from the system, wherein the condensing means is composed of a oblique honeycomb with openings on the front and rear surfaces and on the upper and lower surfaces, arranged so that the front surface faces the side of the first air inlet port and the introduced air passes through the oblique honeycomb, and the second water supply means is installed above the oblique honeycomb.

BEST MODE FOR CARRYING OUT THE INVENTION

The air cleaning method that comprises the first embodiment of the present application will now be described. The humidifying means in the present invention refers to a device equipped with a means for supplying water to the air to be processed and, optionally, a water recovery means and a temperature controlling means, to humidify the air to be processed to have a certain degree of humidity and to recover excessive water. The humidifying means humidifies the air to be processed and, at the same time, adsorbs at least a part of gaseous chemical pollutants contained in the air and removes the chemical pollutants.

The condensing means in the present invention refers to a device equipped with a low-temperature section capable of contacting with the air to be processed and, optionally, a water recovery means to dehumidify the air to be processed to have a certain degree of humidity and to recover condensed water obtained by condensation. The condensing means causes chemical pollutants contained in the air to be processed or the chemical pollutants that have not been removed by the humidifying means to be adsorbed in the condensed water produced during dehumidifying operation and removes the adsorbed chemical pollutants.

In the present invention, an oblique honeycomb arranged with cell openings on the upper and lower surfaces, as well as on the front and rear surfaces, is used either or both of the humidifying means and condensing means. This oblique honeycomb is explained referring to FIG. 1. The oblique honeycomb 1 is composed of a number of waveform sheets 2 and 3 (hereinafter referred to also as "corrugate sheets") propagating in one direction laminated to form a honeycomb structure. Corrugate sheets 2 and 3 are laminated so that the wave propagation direction of one sheet may obliquely cross the wave propagation direction of the next adjacent sheet by turn and the wave propagating direction of every other sheet may be almost the same.

Figure 1:
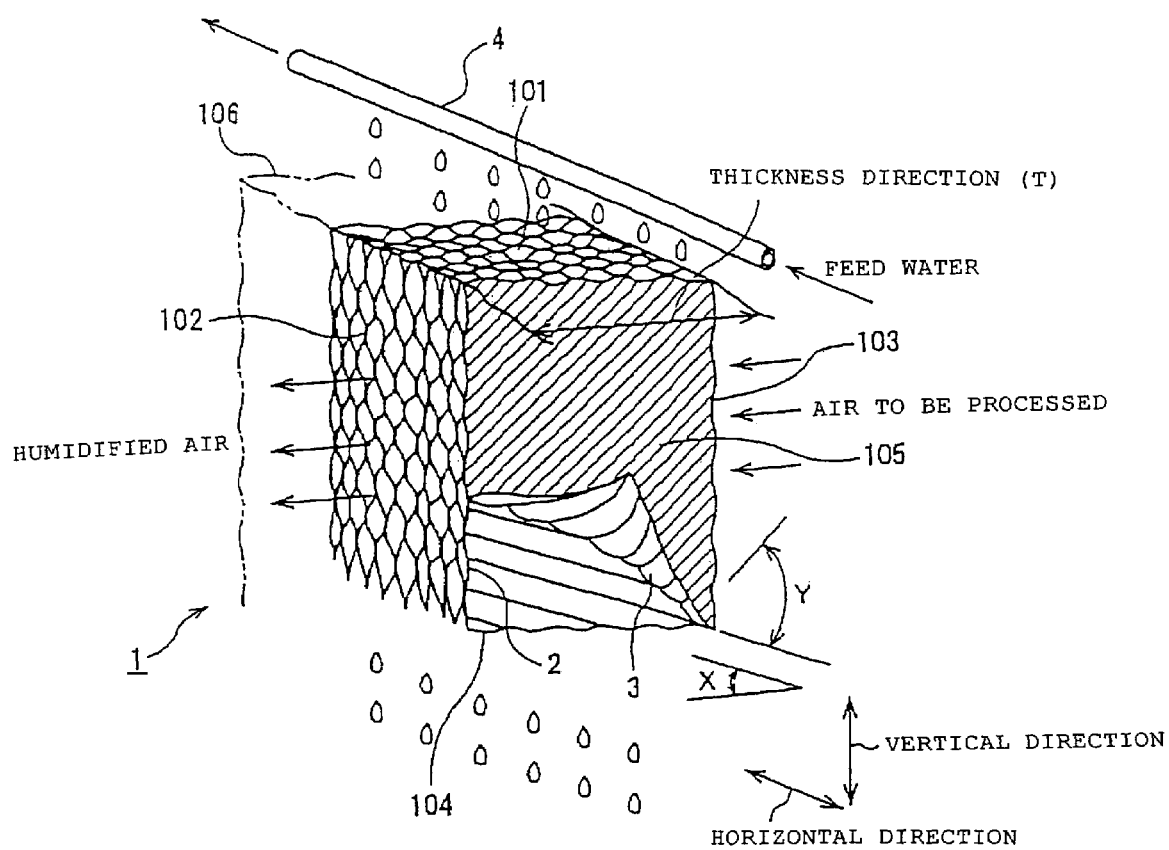
FIG. 1 is a drawing for explaining a oblique honeycomb used in the air cleaning method of the present invention.

The oblique honeycomb 1 forms a rectangular parallelepiped cut by four planes 101–104, each being vertical to the plane parallel to the corrugate sheets 2 and 3. When the rectangular parallelepiped of which all the cut planes are neither parallel nor vertical to the wave propagation direction of the corrugate sheet is placed with one of the cut planes facing downward and the outermost layers 105 and 106 of the corrugate sheet facing either right or left, the front and rear cut planes 102, 103 and the upper and lower cut planes 101, 104 have open honeycomb cells, with the left and right planes being closed by corrugate sheets. The front and rear cut planes 102 and 103 are composed of cells obliquely extending upwardly and cells obliquely extending downwardly that are formed every other layer. The angle made by the direction of obliquely extending cells and the flow-in and flow-out direction of air (parallel to the front and rear surfaces of the rectangular parallelepiped) indicated by X in FIG. 1 is usually 15–45°, and preferably 25–35°. The oblique angle in this range is preferable for maintaining a drop rate in an appropriate range and increasing the contact efficiency.

The angle made when the wave propagation direction of one corrugate sheet crosses the wave propagation direction of the next adjacent sheet by turn, indicated by Y in FIG. 1, is usually 30–90°, and preferably 50–70°. A large substantial contact area for the air to be processed and water with honeycomb cells can be provided by laminating corrugate sheets so that the corrugate sheets may cross in the above angle range when the oblique angle (X) is between 15° and 45°. This increases the contact area of the air to be processed and water, ensuring not only a high humidifying efficiency of air in the humidifying means, but also a high dehumidifying efficiency by condensing water in the air to be processed in the condensing means. Specifically, as discussed later, since the air to be processed is introduced from the front open section 103 of the oblique honeycomb 1, whereas water is supplied from the upper open section 101 via a water supply duct 4, for example, and slowly flows down while permeating through corrugate sheets of the oblique honeycomb, the flowing direction of the air to be processed maintains an appropriate angle with the flow-down direction of water to increase the contact efficiency.

The height of cells, or the length from the bottom to top of the wave, in the oblique honeycomb used in the present invention is usually 2.0–8.0 mm, and preferably 3.0–5.0 mm. If the cell length is less than 2.0 mm, the oblique honeycomb is difficult to manufacture and may have an increased pressure loss. If the cell length exceeds 8.0 mm, the efficiency of removing gaseous chemical pollutants decreases.

The cell width or the cell pitch of the oblique honeycomb in the corrugate sheet form is usually 2.5–12.0 mm, and preferably 5–10.0 mm. The length between the front open section and the rear open section of the oblique honeycomb, or the thickness (t) of the oblique honeycomb, is not specifically restricted, but is usually 100–1,000 mm, and preferably 200–800 mm. A thick oblique honeycomb of about 800 mm thickness is preferably used to sufficiently dehumidify using one honeycomb for removing both chemical pollutants and moisture during a highly humid period such as a rainy season. The thickness less than 100 mm is undesirable due to a decrease in the efficiency of removing $NO_2$ and the like, whereas the thickness more than 1,000 mm does not increase the chemical pollutant removing efficiency proportionate to the increase of the thickness, but rather increases a pressure loss. When two or more oblique honeycombs are used, the total thickness of the oblique honeycombs may be in the above range. For example, when a oblique honeycomb with a thickness of 300 mm is used, three oblique honeycombs, each having a thickness of 100 mm may be layered in the thickness direction to make the total thickness 300 mm. A water shower conventionally used as a humidifying means has a depth of several meters, whereas the oblique honeycomb of the present invention that can be used as a humidifying means has a thickness of about 400 mm at most. Thus, the oblique honeycomb of the present invention can greatly decrease the space for installation. Such a great installation space reduction satisfies a demand for rationalization of semiconductor production factory and the like. In addition, since the power for pumps for water circulation is significantly smaller than that required in conventional water shower, a great energy saving can also be achieved by the oblique honeycomb of the present invention.

The sheet forming the oblique honeycomb is preferably a porous material having irregularities on the surface to ensure a large surface area for the element and to provide a large contact area for water that flows down while permeating through the element with the air to be processed. As examples of such a sheet material, materials having a three-dimensional network structure with a specific fiber void ratio can be given. A typical example is an inorganic fiber base material containing one or more fillers or binders selected from the group consisting of alumina, silica, and titania. Of these, a material containing titania is preferable to increase the efficiency of removing acidic gaseous chemical pollutants. The sheet material contains usually 60–93 wt % of filler or binder and 7–40 wt % of fiber base material, and preferably 70–88 wt % of filler or binder and 12–30 wt % of fiber base material. The sheet material formulation in the above range ensures high water permeability and strength. The sheet material can be produced by a known method, for example, by immersing paper made from ceramic fiber or alumina fiber in a slurry of a binder such as alumina sole and a filler such as alumina hydrate, drying the impregnated sheet material, corrugating the sheet, drying and treating the corrugate sheet with heat, and removing water and organic components. When the sheet material contains silica or titania in addition to alumina, the amount of silica and titania is usually 5–40 parts by weight respectively for 100 parts by weight of alumina.

The fiber void ratio of the inorganic fiber base material containing a binder or filler is usually 65–85%, and preferably 75–82%. The fiber void ratio of the above range ensures adequate permeability and increases the contact efficiency of air and water. The thickness of the inorganic fiber base material containing a binder or filler is usually 200–1,000 μm, and preferably 300–800 μm. The inorganic fiber base material with the fiber void ratio and thickness in the above ranges exhibits an adequate liquid-gas ratio and water permeation rate that increases the contact efficiency of water with air and ensures sufficient strength.

As a method for forming a corrugate sheet from the above inorganic fiber base material, a method of using a known corrugator of a structure allowing a plane sheet to pass through a number of gears with waveform convexes and concaves waving in the radial direction on the surface can be given. As an example of the method for forming a oblique honeycomb from the corrugate sheet thus obtained, a method placing a rectangular corrugate sheet to be cut (a to-be-cut corrugate sheet) with a length of about 100 mm (thickness after formation) and a width of about 3,000 mm so that the wave propagation direction has an angle of 15–45° to one side of the rectangle, cutting the to-be-cut corrugate sheet, arranging the resulting rectangular corrugate sheets so that the wave propagation direction of every one sheet obliquely crosses, then laminating the sheets using or without using an adhesive. In this case, the vertical length of the to-be-cut corrugate sheet is a thickness of one oblique honeycomb. Therefore, if the thickness of a oblique honeycomb required for a humidifying means and condensing means, specifically, the distance between the front open section and the rear open section of a oblique honeycomb, is 300 mm, such an oblique honeycomb can be formed by laminating three sheets of oblique honeycomb with a thickness of 100 mm prepared from the to-be-cut oblique honeycomb with a length of 100 mm. When several sheets of oblique honeycombs are laminated, the oblique honeycombs may be either adhered or not adhered to each other. When not adhered, several sheets may be just arranged in piles.

In the present invention, when a oblique honeycomb is used for either or both the humidifying means and condensing means, the oblique honeycomb is arranged so that the surfaces with open cells are used for the upper and lower surfaces and the front and rear surfaces. This arrangement of the oblique honeycomb enables the air to be introduced from the open front surface and water from the open upper surface. Thus, the air to be processed comes into contact with water so that the flow direction of the air runs at right angles to the downward flow direction of water. Due to this arrangement, the oblique honeycomb of the present invention used as a humidifying means or a condensing means can exhibit a higher air-water contact efficiency than in the conventional humidifying means utilizing water shower or conventional condensing means utilizing a cooler. Chemical pollutants contained in the air to be processed can be removed at a high efficiency and the length of the device can be significantly reduced.

A first embodiment of the air cleaning device of the second invention of the present application will be explained with reference to FIG. 2. The air cleaning device 40 has a humidifying means 13 and a condensing means 23, each composed of a oblique honeycomb 1 with open cells on the front and rear surfaces and on the upper and lower surfaces. Each oblique honeycomb 1 is arranged so that the front surface faces the side of the first air inlet port 11 or the second air inlet port 21, and the introduced air passes through each oblique honeycomb 1. In addition, each oblique honeycomb 1 is provided with a first water supply means 12 or a second water supply means 22. The first air discharge port 14 and the second air inlet port 21 are connected by a conduit or the like.

The first water supply means 12 supplies water to the front oblique honeycomb 1 arranged as a humidifying means 13 in a humidifying section 10 from above a upper open section 101. The second water supply means 22 supplies water to the oblique honeycomb 1 arranged as a condensing means 23 in a condensing section 23 from above a upper open section 101. As an example of the first water supply means 12 and the second water supply means 22, a water supply duct 4 shown in FIG. 1 can be given. Water supplied to the humidifying section 10 passes through the front oblique honeycomb 1 provided as the humidifying means 13 and discharged outside the humidifying section 10 from a first water discharge means 15. Water supplied to the condensing section 20 passes through the rear oblique honeycomb 1 provided as the condensing means 23 and discharged outside the condensing section 20 from a second water discharge means 25.

In the first embodiment, the flow direction of the air to be processed introduced from the first air inlet port 11 or the second air inlet port 21 and the direction of water 301 or 401 supplied for the first water supply means 12 or the second water supply means 22 are designed to have a specific angle by arranging the oblique honeycomb in this manner. Specifically, the arrangement allows the airflow and the water flow contact each other with a certain angel. Due to this arrangement, the oblique honeycomb of the present invention used as a humidifying means or a condensing means can exhibit a higher air-water contact efficiency than in the conventional humidifying means utilizing water shower or conventional condensing means utilizing a cooler. Chemical pollutants contained in the air to be processed can be removed at a high efficiency and the length of the humidifying means and condensing means can be significantly reduced.

In the first embodiment, water is discharged via a first water discharge means 15, whereby a part of water is recycled to the humidifying means 13 via a first circulating pump 16 and the other part of water is allowed to overflow from a dam 15a in a recycle water reservoir 32. Reuse of excess water 302 produced in the humidifying section 10 as water 301 to be supplied to the first water supply means 12 by connecting the pipe 15b with the first water supply means 12 by the first circulating pump 16 is desirable from the viewpoint of resource saving, cost reduction, and control of the chemical pollutant-removing efficiency. In addition, the concentration of chemical pollutants in the recycle water to be supplied to the humidifying means 13 can be controlled to a prescribed level or lower by appropriately controlling the volume of the recycle water reservoir 32 so that the water 302 may be continuously or intermittently discharged and by diluting the recycle water with makeup clean water. Discharge of water from a second water discharge means 25 is the same as in the case of the above-described humidifying means inasmuch as a part of water is recycled to the condensing means 23 via the second circulating pump 26 and the other part of water is allowed to overflow from a dam 25a in a recycle water reservoir 33. Reuse of condensed water 402 produced in the condensing section 20 as water 401 to be supplied to the second water supply means 22 by connecting the pipe 25b with the second water supply means 22 by the second circulating pump 26 is desirable as well in the condensing section 20. The operation of discharging the water 401 from the recycle water reservoir 33 and supplementing clean water is also applied to the condensing section 20. Water supplied to the humidifying section 10 and condensing section 20 may be discharged without recycling.

The humidifying section 10 and condensing section 20 should preferably be constructed as independent systems by appropriately installing a partition 50 to prevent water circulating in the humidifying section 10 and condensing section 20 from mixing to the extent that the air can be processed in either section. Since the degree of pollution of discharge water with chemical pollutants may differ even if water with the same quality is supplied to the humidifying section 10 and condensing section 20, for example, providing independent water systems is preferable to prevent highly polluted water from polluting water in the other system. An additional advantage of employing independent water systems for the humidifying section 10 and condensing section 20 lies in that discharge water can be recycled even if water used in one section differs in quality from the water used in the other section.

As examples of water 301 supplied to the humidifying section 10 by the first water supply means 12, deionized water, city water, and industrial water can be given. Of these, deionized water that contains only a minimal amount of impurities is preferable from the viewpoint of efficiency of chemical pollutant removal. City water and industrial water are preferable from the viewpoint of economy. In the first embodiment, however, in which the air processed in the humidifying section 10 is also processed in the condensing section 20, the water 301 supplied to the first water supply means 12 is preferably city water or industrial water from the viewpoint of economy. As examples of water 401 supplied to the condensing section 20 by the second water supply means 22, water that contains as small an amount of impurities as possible, such as deionized water, can be used, since this section must sufficiently remove chemical pollutants. There are no specific limitations to deionized water. Water obtained from city water or industrial water by treatment with an ion-exchange resin after pretreatment can be used, for example.

In this instance, use of a deionized water supply means as the first water supply means and second water supply means is desirable in view of efficiency of chemical pollutant removal. Use of a city water supply means or industrial water supply means as the first water supply means and a deionized water supply means as the second water supply means is desirable in view of economy. The temperature and amount of water 301 and water 401 supplied respectively to the first water supply means 12 and second water supply means 22 can be appropriately selected according to the feed rate of the air to be processed so that desired temperature and humidity conditions may be ensured for the humidifying section 10 and condensing section 20. However, since the absolute humidity is always higher in the humidifying section 10 than in the condensing section 20, the temperature of water 301 supplied to the first water supply means 12 should be higher than the water 401 supplied to the second water supply means 22.

Figure 2:
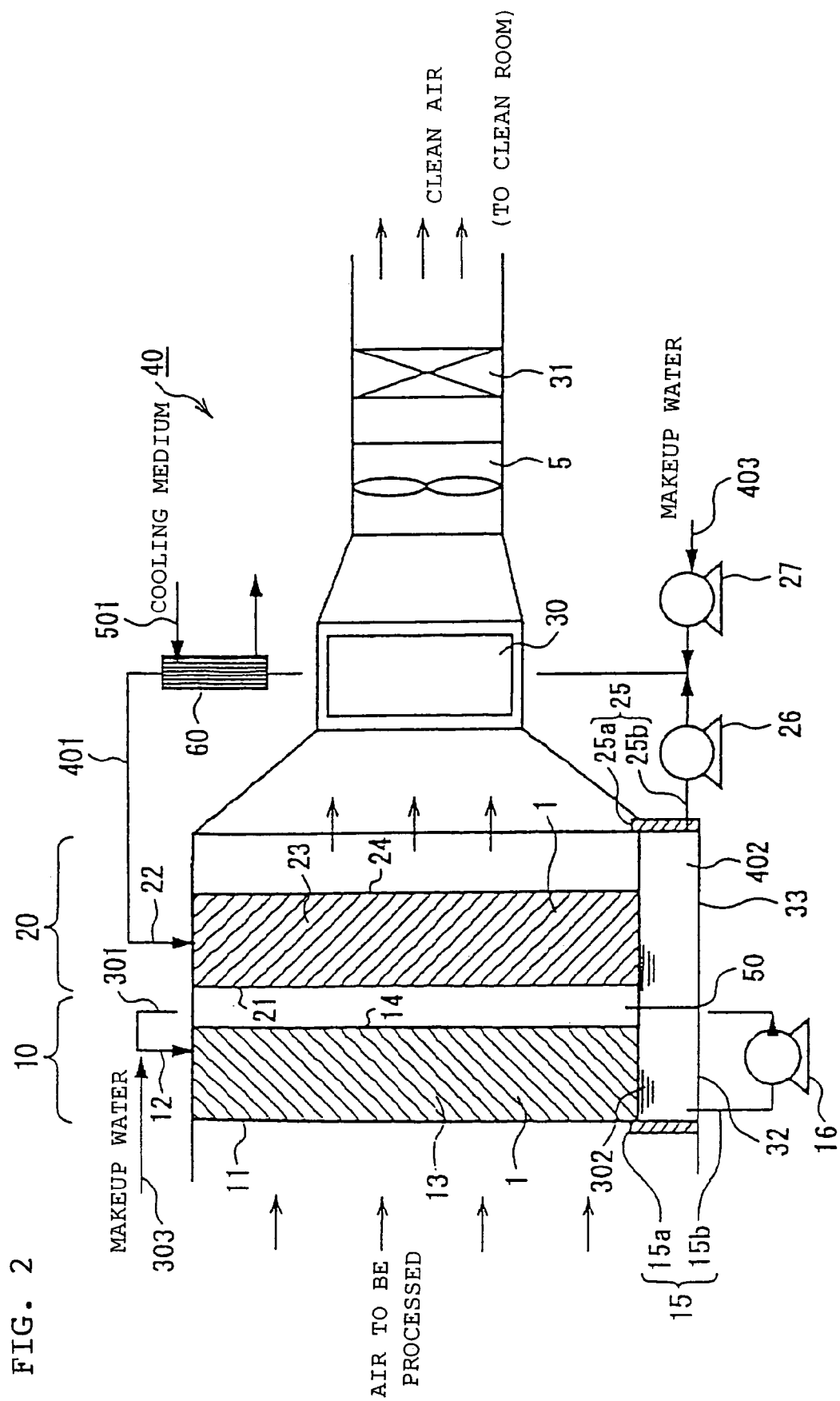
FIG. 2 is a schematic view of an outline of a first embodiment of the air cleaning device of the present invention.

The device of the first embodiment may optionally be provided with a temperature or humidity control means 30 or ULPA after the second air discharge port as shown in FIG. 2. If the temperature or humidity control means 30 is provided and the air discharge port for discharging the air processed by this means is connected to a clean room, for example, a clean room may have required temperature and humidity conditions. As examples of the temperature and humidity control means, a heat and hot water can be given. When a heater is used, the relative humidity decreases according to an increase in temperature of the air. When a hot water is used, a simple operation of causing the hot water to come into contact directly or indirectly with processed air is sufficient. When the hot water is caused to come into contact indirectly with processed air, for example, the operation is just to supply hot water to a heat exchanger 60 or the like. Although the relative humidity of air after treatment decreases when hot water is caused to come into contact indirectly with the air, the relative humidity of the air after treatment may become either higher or lower than before the treatment according to the conditions when hot water is caused to come into contact directly with air.

Air cleaning process using the air cleaning device of the first embodiment will now be described. The air to be processed is introduced into the humidifying section 10 via a duct using a blower 5 or the like. The cell of the humidifying section 10 has a permeating wall structure, wherein water 301 is supplied from above the front-end oblique honeycomb 1 functioning as a humidifying means 13 and slowly descends in the oblique honeycomb 1 while cooling the entire cell. The air to be processed comes into contact with the cell surface and heated to a prescribed temperature. In this instance, the air to be processed is humidified with water vaporizing from the cell surface, during which a part of chemical pollutants in the air is adsorbed in water forming a water membrane. In this instance, some chemical pollutants are removed from the air to be processed. After reaching the bottom of the oblique honeycomb 1, permeated water is discharged from the humidifying section 10 via a first water discharge means 15 as surplus water 302.

The air to be processed humidified in the humidifying section 10 is sent to the condensing section 20. In the condensing section 20, the air to be processed is cooled by water membrane formed on the cell surface of the oblique honeycomb 1 from water supplied from a second water supply means 22 and cooled by a heat exchanger 60 or the like to a temperature below the temperature in the humidifying section 10. In this instance, water in the air is condensed and almost all chemical pollutants remaining in the air without being removed in the humidifying section 10 are adsorbed in condensed water 401 and recovered together with the supplied water. As a result, almost all chemical pollutants in the air to be processed can be removed. It is sufficient for the operation of the device insofar as the temperature of water in the humidifying section 10 is higher than the temperature of water in the condensing section 20. The temperatures are appropriately adjusted so that air with the desired temperature and humidity can be obtained. After the condensation process in the condensing section 20, the air is sent as is, or via a temperature/humidity adjusting means 30 to appropriately adjust the temperature and humidity, to a clean room or the like as clean air.

Since a clean room is commonly adjusted to about 23° C. and 40–50% RH, the conditions of the humidifying and condensing steps are set so that clean air after the condensing step may be appropriately heated to about 23° C. while adjusting the relative humidity to the above range. The clean air at about 23° C. and 40–50% RH obtained in this manner is used as the air for a clean room.

Using the air cleaning device of the first embodiment, due to the humidifying or condensing operation using water flowing down a oblique honeycomb while permeating through a waveform inorganic porous plate forming the oblique honeycomb, chemical pollutants once adsorbed in circulating water are not desorbed from the circulating water even in the case where recycled water contains chemical pollutants. In conventional methods in which water-containing pollutants are sprayed, chemical pollutants are desorbed and dispersed in the air as a mist. In the present invention, by contrast, since only water is vaporized from a large surface area of the honeycomb, leaving once adsorbed chemical pollutants in the water, the chemical pollutants are difficult to be dispersed. For this reason, not only deionized water but also city water and industrial water can be used when the oblique honeycomb is used as a humidifying means. In addition, since the oblique honeycomb exhibits a high chemical pollutant removing efficiency, a liquid-gas ratio which must be about 1–2 in conventionally water shower or the like can be reduced to as small as 0.1. In addition, the amount of water supplied to the humidifying means and condensing means can be reduced if the water is recycled for reuse, resulting in a reduced capacity of pumps and the like. Furthermore, $NO_2$ that could have been removed only with difficulty in conventional methods can be efficiently removed by using the above-described specific material for the oblique honeycomb. The first embodiment excels in the chemical pollutant removing efficiency and space saving as compared with the second and third embodiments. Thus, this is an ideal embodiment.

The second embodiment of the air cleaning device will now be described. In the second embodiment, the oblique honeycomb is used only for the humidifying means, with no specific limitations to the type of the condensing means. If the oblique honeycomb exhibiting a high water-air contact efficiency is used as the humidifying means, chemical pollutants in the air can be removed at a higher efficiency so that a higher chemical pollutant removal efficiency can be achieved even if a conventional cooler or the like is used as the condensing means. The space efficiency can also be increased by the space reduction due to the use of the oblique honeycomb for the humidifying means. Since the thickness of oblique honeycomb is about 100–400 mm thinner than the thickness of a conventional water shower device, the thickness of the humidifying section can be reduced by a predetermined factor.

Reuse of water discharged from the first water discharge means 15 as the water to be supplied to the first water supply means 12 by connecting the first water discharge means 15 with the first water supply means 12 by the first circulating pump 16 in the same manner as in the first embodiment is also preferable in the second embodiment from the same reason applicable to the humidifying section 10 in the first embodiment. For the same reason as in the first embodiment, a partition is preferable installed between the humidifying section 10 and condensing section 20 to the extent that the air to be processed can flow between them.

For the same reason as in the humidifying section 10 of the first embodiment, deionized water, tap water, and industrial water can be given as examples of water supplied to the humidifying section 10 by the first water supply means 12. Of these, deionized water, city water, or industrial water can be appropriately selected based on the same standard as applied to the humidifying section 10 of the first embodiment. In the second embodiment, deionized water is preferably used to increase the chemical pollutant removal efficiency as high as possible. In the second embodiment, the deionized water supply means is preferably used as the first water supply means in view of efficiency of chemical pollutant removal. In the same manner as in the first embodiment, the second embodiment may optionally be provided with a temperature or humidity control means 30 after the second air discharge port. When the condensing means is not provided, the temperature or humidity control means 30 may be installed after the first air discharge port 14. The same effect as in the first embodiment can be expected in the second embodiment by the use of the oblique honeycomb as the humidifying means instead of a known water shower or the like. This embodiment is suitable when processing dry air in wintertime.

The third embodiment of the air cleaning device will now be described. In the third embodiment, the oblique honeycomb is used only for the condensing means, with no specific limitations to the type of the humidifying means. If the oblique honeycomb exhibiting a high water-air contact efficiency is used as the condensing means, chemical pollutants in the air can be removed at a higher efficiency so that a higher chemical pollutant removal efficiency can be achieved even if a conventional water shower or the like is used as the humidifying means. The space efficiency can also be increased by the space reduction due to the use of the oblique honeycomb for the condensing means. Since the thickness of oblique honeycomb is about 100–400 mm thinner than the thickness of a conventional cooler such as heat exchanger, the thickness of the humidifying section can be reduced by a predetermined factor.

Reuse of water discharged from the second water discharge means 25 as the water to be supplied to the second water supply means 22 by connecting the second water discharge means 25 with the second water supply means 22 by the second circulating pump 26 in the same manner as in the condensing section 20 of the first embodiment is also preferable in the third embodiment from the same reason applicable to the condensing section 20 of the first embodiment. For the same reason as applied to the condensing section 20 of the first embodiment, a partition is preferable installed between the humidifying section 10 and condensing section 20 to the extent that the air to be processed can flow between them.

For the same reason as applied to the condensing section 20 of the first embodiment, as examples of water supplied to the condensing section 20 by the second water supply means 22, water that contains as small an amount of impurities as possible, such as deionized water, can be used, since this section must sufficiently remove chemical pollutants. In the third embodiment, the deionized water supply means is preferably used as the second water supply means in view of efficiency of chemical pollutant removal.

Since a high chemical pollutant removal efficiency can be achieved in the condensing section using the oblique honeycomb as the condensing means, the third embodiment need not be provided with a humidifying means when the air to be processed has a high humidity or a low content of chemical pollutants or when a rather high chemical pollutant content is permitted for the water after processing. This embodiment is particularly effective for processing air with a high temperature and high humidity during the period from the rainy season to summer, in particular, since the air with a high temperature and high humidity can be processed as is in this device. A preferable feature of the device is reduction of cost and space for installation. In the same manner as in the first embodiment, the third embodiment may optionally be provided with a temperature or humidity control means 30 after the second air discharge port. The same effect as in the first embodiment can be expected in the third embodiment by the use of the oblique honeycomb as the condensing means instead of a conventionally known cooler or the like.

The fourth embodiment of the air cleaning device has integrally joined first air discharge port 14 and second air inlet port 21 to sequentially perform the humidifying operation and condensing operation in one oblique honeycomb. Specifically, the air to be processed is introduced into the first air inlet port 11 in the front end of the oblique honeycomb via a duct 4 using a blower 5 or the like. The front section of the oblique honeycomb functions as a humidifying zone, where the air to be processed is humidified to have a prescribed humidity, followed by dehumidification to a saturated state within the oblique honeycomb. Therefore, a part of chemical pollutants in the air is adsorbed in excess water in the humidifying zone and the remaining portion of chemical pollutants that have not been removed in the humidifying zone is adsorbed in condensed water in the dehumidifying zone.

Reuse of water discharged from the water discharge means as the water to be supplied to the water supply means by connecting one water discharge means with one water supply means by a circulating pump is preferable in the fourth embodiment from the same reason applicable to the condensing section 20 of the first embodiment. As examples of water supplied to the humidifying zone and dehumidifying zone by a water supply means, water that contains as small an amount of impurities as possible, such as deionized water, can be used, since this section must sufficiently remove chemical pollutants. In the fourth embodiment, the deionized water supply means is preferably used as the first water supply means in view of efficiency of chemical pollutant removal.

In the present invention, chemical pollutants refer to fine chemical substances that can permeate through high performance ULPA filter and include, for example, inorganic metal element such as sodium, potassium, calcium, and boron, anions such as fluorine ion, chloride ion, nitric acid ion, nitrous acid ion, sulfuric acid ion, sulfurous acid ion, and cations such as ammonium ion.

Although there are no specific limitations to the size of air cleaning device of the present invention, a oblique honeycomb with a length of 1,000–5,000 mm, width of 1,000–5,000, and thickness of 100–400 mm can be used for the air cleaning device used in factories for manufacturing semiconductors and liquid crystal devices.

EXAMPLES

The present invention will be described in more detail by examples, which should not be construed as limiting the present invention.

Examples 1–3 and Comparative Examples 1–3

Air cleaning devices having humidifying means and condensing means with a specification shown in Tables 1–3 were fabricated. Air was processed under the conditions shown in Tables 4–6 to obtain the results shown in Tables 7–9. The clean air obtained was heated under the conditions shown in Tables 10–12 for use as clean air for a clean room. The results are shown in Tables 10–12. Since the devices of Examples 5–9 are not provided with a humidifying zone, the air to be processed is directly supplied to the condensing zone. Oblique honeycombs made from corrugate sheets of nonwoven fabrics shown in Tables 1–3, arranged so that corrugate sheets vertically cross every one layer and an oblique angle of the cells is 30 to the flow-in direction of air, were used. Waters from independent systems were respectively used for the humidifying means and condensing means. These waters were recycled in Example 4 and Comparative Examples 2, whereas one-pass operation was adopted in Examples 1–3 and 5–11 and Comparative Examples 1 and 3. Water was supplemented to maintain the chemical pollutant content in the recycle water to a prescribed concentration or less. For example, the concentration of ammonium ion is 10 ppb in Example 3 and 500 ppb in Example 4. If the concentration of ammonium ion is more than 500 ppb, ammonia is vaporized from a conventional water shower, resulting in an undue decrease in the removal efficiency by adsorption. Air washer used in Tables refers to water shower.

TABLE 1

|  | Comparative Example 1 | Comparative Example 2 | Example 1 | Example 2 |
|---|---|---|---|---|
| Type of humidifying means in humidifying zone | Air washer *2 | Air washer *2 | Oblique honeycomb | Air washer *2 |
| Length of humidifying zone (mm) | 5000 | 5000 | 200 | 5000 |
| Type of condensing means in condensing zone | Cooler *1 | Cooler *1 | Cooler *1 | Oblique honeycomb |
| Length of condensing zone (mm) | 600 | 600 | 600 | 600 |
| Specification of oblique honeycomb |  |  |  |  |
| Cell pitch (mm) | — | — | 10.0 | 10.0 |
| Hill length of cell (size) (mm) | — | — | 5.0 | 5.0 |
| Thickness of honeycomb (mm) | — | — | 200 | 600 |
| Cell material (type of binder) *2 | — | — | Alumina | Alumina |

*1 Cooler with cooling fins
*2 Trademark "Air washer" (Sinko Industries Co., Ltd.)

TABLE 2

|  | Example 3 | Example 4 | Example 5 | Example 6 | Comparative Example 3 |
|---|---|---|---|---|---|
| Type of humidifying means in humidifying zone | Oblique honeycomb | Oblique honeycomb | None | None | Air washer *2 |
| Length of humidifying zone (mm) | 200 | 200 |  |  | 5000 |
| Type of condensing means in condensing zone | Oblique honeycomb | Oblique honeycomb | Oblique honeycomb | Oblique honeycomb | Packing column *1 |
| Length of condensing zone (mm) | 600 | 600 | 600 | 500 | 1000 |
| Specification of oblique honeycomb |  |  |  |  |  |
| Cell pitch (mm) | 10.0 | 10.0 | 10.0 | 10.0 | — |
| Hill length of cell (mm) | 5.0 | 5.0 | 5.0 | 5.0 | — |
| Thickness of honeycomb (mm) | 200/600 | 200/600 | –/600 | –/500 | — |
| Cell material (binder) | Alumina | Alumina | Alumina | Alumina | — |

*1 Water-air counter current heat exchanger filled with raschig rings

TABLE 3

|  | Example 7 | Example 8 | Example 9 | Example 10 | Example 11 |
|---|---|---|---|---|---|
| Type of humidifying means in humidifying zone | None | None | None | Oblique honeycomb | Oblique honeycomb |
| Length of humidifying zone (mm) |  |  |  | 700 *3 | 300 *2 |
| Type of condensing means in condensing zone | Oblique honeycomb | Oblique honeycomb | Oblique honeycomb | Oblique honeycomb | Oblique honeycomb |
| Length of condensing zone (mm) | 250 *1 | 250 *1 | 200 *2 | 700 *3 | 300 *2 |
| Specification of oblique honeycomb |  |  |  |  |  |
| Cell pitch (mm) | 8.0 | 10.0 | 10.0 | 10.0 | 10.0 |
| Hill length of cell (mm) | 3.5 | 5.0 | 5.0 | 5.0 | 5.0 |
| Thickness of honeycomb (mm) | 250 *1 | 250 *1 | 200 *2 | 700 *3 | 200 *2 |
| Cell material (Type of packing material) (Glass fiber base material) | Alumina | Alumina | Composite material *4 | Alumina | Alumina |

*1 Fiber sheets of oblique honeycombs, each having a thickness of 50 mm, were layered to have the total thickness of 250 mm.
*2 Four sheets of oblique honeycombs, each having a thickness of 50 mm, were layered to have the total thickness of 200 mm.
*3 Seven sheets of oblique honeycombs, each having a thickness of 100 mm, were layered to have the total thickness of 700 mm.
*4 Glass fiber base material + alumina sol (binder) + alumina/titania (packing material); alumina 40%, titania 40%, silica 20%, void ratio 79%

TABLE 4

|  |  | Comparative Example 1 | Comparative Example 2 | Example 1 | Example 2 |
|---|---|---|---|---|---|
| Air before processing | Type of air to be processed | Outside air | Outside air | Outside air | Outside air |
|  | Liquid/gas ratio (g-water/g-air) (Humidifying/condensation) | 2.0/1.2 *1 | 2.0/1.2 | 0.4/1.2 | 2.0/0.4 |
|  | Inlet air temperature (° C.) | 25 | 25 | 25 | 25 |
|  | Absolute humidity (g-water/kg-air) | 12 | 12 | 12 | 12 |
|  | $NH_4^+$ concentration (ppt) at inlet port | 26000 | 26000 | 26000 | 26000 |
|  | $SO_4^{2-}$ concentration (ppt) at inlet port | 5200 | 5200 | 5200 | 5200 |
|  | $Cl^-$ concentration (ppt) at inlet port | 400 | 400 | 400 | 400 |
|  | $NO_2^-$ concentration (ppt) at inlet port | 3500 | 3500 | 3500 | 3500 |
| Humidifying zone | Type of process water | Deionized water | Deionized water | Deionized water | Deionized water |
|  | Temperature (° C.) | 16 | 16 | 16 | 16 |
|  | $NH_4^+$ concentration (ppt) in water | 100 | 500000 | 100 | 100 |
| Condensing zone | Type of process water | City water *2 | City water *2 | Deionized water *2 | Deionized water |
|  | Temperature (° C.) | 8 | 8 | 8 | 8 |
|  | $NH_4^+$ concentration (ppt) in water | — | — | — | 100 |

*1 Liquid/gas ratio at humidifying zone: 2.0 g-water/g-air, liquid/gas ratio at condensing zone: 1.2 g-water/g-air
*2 $Cl^-$ concentration: 270 (ppb)

TABLE 5

|  |  | Example 3 | Example 4 | Example 5 | Example 6 | Comparative Example 3 |
|---|---|---|---|---|---|---|
| Air before processing | Type of air to be processed | Outside air | Outside air | Outside air | CR *1 | CR *1 |
|  | Liquid/gas ratio (g-water/g-air) (Humidifying/condensation) | 2.0/0.8 *2 | 0.4/0.8 | —/0.8 | —/0.8 | 2.0/2.0 |
|  | Inlet air temperature (° C.) | 25 | 25 | 17 | 23 | 25 |
|  | Absolute humidity (g-water/kg-air) | 12 | 12 | 12 | 7.8 | 12 |
|  | $NH_4^+$ concentration (ppt) at inlet port | 26000 | 26000 | 26000 | 7500 | 26000 |
|  | $SO_4^{2-}$ concentration (ppt) at inlet port | 5200 | 5200 | 5200 | 850 | 5200 |
|  | $Cl^-$ concentration (ppt) at inlet port | 400 | 400 | 400 | 250 | 400 |
|  | $NO_2^-$ concentration (ppt) at inlet port | 3500 | 3500 | 3500 | 1200 | 3500 |
| Humidifying zone | Type of process water | City water | City water | — | — | Deionized water |
|  | Temperature (° C.) | 16 | 16 | — | — | 16 |
|  | $NH_4^+$ concentration (ppt) in water | 100000 | 500000 | — | — | 100 |
| Condensing zone | Type of process water | Deionized water | Deionized water | Deionized water | Deionized water | Deionized water |
|  | Temperature (° C.) | 8 | 8 | 8 | 8 | 8 |
|  | $NH_4^+$ concentration (ppt) in water | 100 | 500000 | 100 | 100 | 100 |

*1 Circulating air in clean room
*2 Liquid/gas ratio at humidifying zone: 0.4 g-water/g-air, liquid/gas ratio at condensing zone: 0.8 g-water/g-air

TABLE 6

|  |  | Example 7 | Example 8 | Example 9 | Example 10 | Example 11 |
|---|---|---|---|---|---|---|
| Air before processing | Type of air to be processed | Outside air | Outside air | Outside air | Outside air | Outside air |
|  | Liquid/gas ratio (g-water/g-air) (Humidifying/condensation) | —/0.4 | —/0.4 | —/0.4 | 1.2/1.2 | 0.4/0.4 |
|  | Inlet air temperature (° C.) | 25 | 25 | 25 | 25 | 25 |
|  | Absolute humidity (g-water/kg-air) | 6 | 6 | 6 | 12 | 6 |
|  | $NH_4^+$ concentration (ppt) at inlet port | 26000 | 26000 | 26000 | 26000 | 26000 |
|  | $SO_4^{2-}$ concentration (ppt) at inlet port | 5200 | 5200 | 5200 | 5200 | 5200 |
|  | $Cl^-$ concentration (ppt) at inlet port | 400 | 400 | 400 | 400 | 400 |
|  | $NO_2^-$ concentration (ppt) at inlet port | 3500 | 3500 | 3500 | 3500 | 3500 |
| Condensing zone *1 | Type of process water | Deionized water | Deionized water | Deionized water | Deionized water | Deionized water |
|  | Temperature (° C.) | 9 | 9 | 9 | 8 | 9 |
|  | $NH_4^+$ concentration (ppt) in water | 100 | 100 | 100 | 100 | 100 |

*1 Humidifying section and condensing section in Examples 10 and 11

TABLE 7

|  |  | Comparative Example 1 | Comparative Example 2 | Example 1 | Example 2 |
|---|---|---|---|---|---|
| Humidifying zone | Outlet air temperature (° C.) | 20 | 20 | 20 | 20 |
|  | Absolute humidity (g-water/kg-air) | 14.2 | 14.2 | 14.2 | 14.2 |
|  | Outlet $NH_4^+$ concentration (ppt) | 9880 | 20800 | 2500 | 20800 |
|  | $NH_4^+$ removal rate *1 (%) | 62.0 | 20.0 | 90.3 | 20.0 |
|  | Pressure loss (Pa) | 84 | 84 | 27 | 84 |
| Condensing zone | Outlet air temperature (° C.) | 10.0 | 10.0 | 10.0 | 10.0 |
|  | Absolute humidity (g-water/kg-air) | 7.8 | 7.8 | 7.8 | 7.8 |
|  | Outlet $NH_4^+$ concentration (ppt) | 4300 | 1700 | 2000 | 1500 |
|  | $SO_4^{2-}$ concentration (ppt) at outlet port | 990 | 940 | 310 | 234 |
|  | $Cl^-$ concentration (ppt) at outlet port | 84 | 70 | 32 | 26 |
|  | $NO_2^-$ concentration (ppt) at outlet port | 1560 | 1470 | 630 | 315 |
|  | $NH_4^+$ removal rate *2 (%) | 56.5 | 18.3 | 20.0 | 92.8 |
|  | Pressure loss (Pa) | 160 | 160 | 160 | 81 |
| Total | Overall $NH_4^+$ removal rate *3 (%) | 83.5 | 34.6 | 92.3 | 94.2 |
|  | Overall $SO_4^{2-}$ removal rate (%) | 81.0 | 81.9 | 94.0 | 95.5 |
|  | Overall $Cl^-$ removal rate (%) | 80.0 | 82.5 | 92.0 | 93.5 |
|  | Overall $NO_2^-$ removal rate (%) | 55.4 | 58.0 | 82.0 | 91.0 |
|  | Pressure loss (Pa) | 244 | 244 | 187 | 165 |

*1 Removal rate in humidifying zone alone
*2 Removal rate in condensing zone alone
*3 Total removal rate in humidifying zone and condensing zone

TABLE 8

|  |  | Example 3 | Example 4 | Example 5 | Example 6 | Comparative Example 3 |
|---|---|---|---|---|---|---|
| Humidifying zone | Outlet air temperature (° C.) | 17 | 17 | — | — | 20 |
|  | Absolute humidity (g-water/kg-air) | 12.0 | 12.0 | — | — | 14.2 |
|  | Outlet $NH_4^+$ concentration (ppt) | 2500 | 2600 | — | — | 9880 |
|  | $NH_4^+$ removal rate *1 (%) | 90.3 | 90.0 | — | — | 62.0 |
|  | Pressure loss (Pa) | 27 | 27 | — | — | 84 |
| Condensing zone | Outlet air temperature (° C.) | 10.0 | 10.0 | 10.0 | 10.0 | 10.0 |
|  | Absolute humidity (g-water/kg-air) | 7.8 | 7.8 | 7.8 | 7.8 | 7.8 |
|  | Outlet $NH_4^+$ concentration (ppt) | 1000 | 1000 | 1500 | 578 | 3900 |
|  | $SO_4^{2-}$ concentration (ppt) at outlet port | 200 | 200 | 234 | 85 | 570 |
|  | $Cl^-$ concentration (ppt) at outlet port | 26 | 26 | 26 | 28 | 40 |
|  | $NO_2^-$ concentration (ppt) at outlet port | 280 | 280 | 315 | 132 | 1220 |
|  | $NH_4^+$ removal rate *2 (%) | 60.0 | 61.5 | 94.2 | 92.3 | 85.0 |
|  | Pressure loss (Pa) | 81 | 81 | 81 | 68 | 200 |
| Total | Overall $NH_4^+$ removal rate *3 (%) | 96.1 | 96.1 | 94.2 | 92.3 | 85.0 |
|  | Overall $SO_4^{2-}$ removal rate (%) | 96.1 | 96.1 | 95.5 | 92.0 | 87.0 |
|  | Overall $Cl^-$ removal rate (%) | 93.5 | 93.5 | 93.5 | 89.0 | 90.0 |
|  | Overall $NO_2^-$ removal rate (%) | 92.0 | 92.0 | 91.0 | 89.0 | 65.1 |
|  | Pressure loss (Pa) | 108 | 108 | 81 | 68 | 284 |

*1 Removal rate in humidifying zone alone
*2 Removal rate in condensing zone alone
*3 Total removal rate in humidifying zone and condensing zone

TABLE 9

|  |  | Example 7 | Example 8 | Example 9 | Example 10 | Example 11 |
|---|---|---|---|---|---|---|
| Condensing zone *1 | Outlet air temperature (° C.) | 12.5 | 12.5 | 12.0 | 10.0 | 12.0 |
| | Absolute humidity (g-water/kg-air) | 9.5 | 9.5 | 9.2 | 7.8 | 9.2 |
| | Outlet $NH_4^+$ concentration (ppt) | 1600 | 2300 | 2200 | 1000 | 2300 |
| | $SO_4^{2-}$ concentration (ppt) at outlet port | 250 | 340 | 310 | 200 | 310 |
| | $Cl^-$ concentration (ppt) at outlet port | 28 | 35 | 32 | 26 | 32 |
| | $NO_2^-$ concentration (ppt) at outlet port | 340 | 420 | 350 | 280 | 610 |
| | $NH_4^+$ removal rate (%) | 93.8 | 91.2 | 91.5 | 96.1 | 90.8 |
| | Pressure loss (Pa) | 50 | 34 | 40.5 | 94.5 | 27 |
| Total | Overall $NH_4^+$ removal rate (%) | 95.4 | 91.2 | 91.5 | 96.1 | 92.3 |
| | Overall $SO_4^{2-}$ removal rate (%) | 95.2 | 93.4 | 94.0 | 96.1 | 94.0 |
| | Overall $Cl^-$ removal rate (%) | 93.0 | 91.3 | 92.0 | 93.5 | 92.0 |
| | Overall $NO_2^-$ removal rate (%) | 90.3 | 88.0 | 90.0 | 92.0 | 82.5 |
| | Pressure loss (Pa) | 50 | 34 | 27 | 94.5 | 27 |

*1 Humidifying section and condensing section in Examples 10 and 11

TABLE 10

| Heating conditions for the air to be processed | Comparative Example 1 | Comparative Example 2 | Example 1 | Example 2 |
|---|---|---|---|---|
| Heating source | Heater | Heater | Heater | Heater |
| Outlet air temperature of heater (° C.) | 22.5 | 22.5 | 22.5 | 22.5 |
| Relative humidity (%) | 47.0 | 47.0 | 47.0 | 38.0 |

TABLE 11

| Heating conditions for the air to be processed | Example 3 | Example 4 | Example 5 | Example 6 | Comparative Example 3 |
|---|---|---|---|---|---|
| Heating source | Hot water *1 | Hot water *1 | Hot water *1 | Hot water *1 | Hot water *1 |
| Outlet air temperature of heater (° C.) | 22.5 | 22.5 | 22.5 | 22.5 | 22.5 |
| Relative humidity (%) | 42.0 | 42.0 | 43.0 | 44.0 | 48.0 |

*1 Heated with a heat exchanger of the type in which water flows in coiled pipe with fins.

TABLE 12

| Heating conditions for the air to be processed | Example 7 | Example 8 | Example 9 | Example 10 |
|---|---|---|---|---|
| Heating source | Hot water *1 | Hot water *1 | Hot water *1 | Hot water *1 |
| Outlet air temperature of heater (° C.) | 22.5 | 22.5 | 22.5 | 22.5 |
| Relative humidity (%) | 43.0 | 45.0 | 43.0 | 45.0 |

*1 Heated with a heat exchanger of the type in which water flows in coiled pipe with fins.

The air cleaning method of the present invention (1) exhibits a high removal efficiency of gaseous chemical pollutants, (2) can efficiently remove $NH_4$ and $NO_{2-}$ that are chemical pollutants conventionally difficult to increase adsorption efficiency, and (3) since the air to be processed is caused to come into contact with water flowing down a oblique honeycomb while permeating through a waveform inorganic porous plate forming the oblique honeycomb, only water is vaporized from a large surface area of the honeycomb, leaving once adsorbed chemical pollutants in water. Therefore, the chemical pollutants are difficult to be dispersed and do not pollute the air to be processed again.

The air cleaning device of the present invention is compact due to the use of inexpensive oblique honeycomb, resulting in resource saving and significant reduction of process cost. (2) Since the air cleaning device can be operated using a smaller amount of deionized water, the manufacturing cost of deionized water and pump delivery capacity can be reduced. (3) Since the pressure loss produced when the air to be processed passes through the air cleaning device is small, ventilation power can be reduced.

INDUSTRIAL APPLICABILITY

The air cleaning device of the present invention can be used for purifying air to be supplied to a clean room in facilities for manufacturing semiconductors and liquid crystal devices, pharmaceutical factories, life science-related facilities, and the like. The air cleaning method of the present invention can be easily and securely carried out using the above air cleaning device.

The invention claimed is:

1. A method of cleaning air comprising a humidifying step of using a oblique honeycomb arranged with openings on the front and rear surfaces and on the upper and lower surfaces as a humidifying means, wherein air containing chemical pollutants is supplied from the front opening and water is supplied from the upper opening to the oblique honeycomb to humidify the air to a prescribed humidity and at least a part of the chemical pollutants in the air is adsorbed into excess water, thereby removing the chemical pollutants and a dehumidifying step wherein clean air dehumidified in the dehumidifying step is heated to a prescribed temperature and used as air for a clean room.

2. A method of cleaning air comprising a dehumidifying step of using a oblique honeycomb arranged with openings on the front and rear surfaces and on the upper and lower surfaces as a condensing means, wherein air containing chemical pollutants is supplied from the front opening and water is supplied from the upper opening of the oblique honeycomb to dehumidify the air to a prescribed humidity and adsorb the chemical pollutants in the air into condensed water, thereby removing the chemical pollutants from the air wherein the clean air dehumidified in the dehumidifying step is heated to a prescribed temperature and used as air for a clean room.

3. A method of cleaning air comprising a humidifying step of using a front oblique honeycomb arranged with openings on the front and rear surfaces and on the upper and lower surfaces as a humidifying means, wherein air containing chemical pollutants is supplied from the front opening and water is supplied from the upper opening of the oblique honeycomb to humidify the air to a prescribed humidity and adsorb a part of the chemical pollutants in the air into excess water, thereby removing the chemical pollutants from the air, and a dehumidifying step of using a rear oblique honeycomb arranged with openings on the front and rear surfaces and on the upper and lower surfaces as a condensing means, maintained at a temperature lower than the temperature of the front oblique honeycomb, wherein the air humidified in the humidifying step is introduced into the rear oblique honeycomb from the front opening and water is supplied from the upper opening of the rear oblique honeycomb to dehumidify the humidified air and adsorb the chemical pollutants not removed in the humidifying step into the condensed water, thereby removing the chemical pollutants.

4. A method of cleaning air comprising a humidifying step of using a oblique honeycomb arranged with openings on the front and rear surfaces and on the upper and lower surfaces as a humidifying means, wherein air containing chemical pollutants is supplied from the front opening and water is supplied from the upper opening to the oblique honeycomb to humidify the air to a prescribed humidity and adsorb at least a part of the chemical pollutants in the air into excess water, thereby removing the chemical pollutants, and a dehumidifying step of dehumidifying the air humidified in the humidifying step to a prescribed humidity using a condensing means and adsorbing the chemical pollutants remaining without being removed in the humidifying step into the condensed water, thereby removing the chemical pollutants.

5. A method of cleaning air comprising a humidifying step of humidifying the air to a prescribed humidity by using a humidifying means and adsorbing a part of the chemical pollutants in the air into excess water, thereby removing the chemical pollutants from the air, and a dehumidifying step of using a oblique honeycomb arranged with openings on the front and rear surfaces and on the upper and lower surfaces and maintained at a temperature lower than the temperature of the humidifying step as a condensing means, wherein the air humidified in the humidifying means is supplied from the front opening and water is supplied from the upper opening of the oblique honeycomb to dehumidifying the air humidified by the humidifying means to a prescribed humidity using the condensing means and adsorbing the chemical pollutants remaining without being removed in the humidifying step into the condensed water, thereby removing the chemical pollutants.

6. A method of cleaning air comprising providing a oblique honeycomb arranged with openings on the front and rear surfaces and on the upper and lower surfaces to provide air from the front opening and water from the upper opening, a front section of the oblique honeycomb being used as a humidifying section to humidify the air to a prescribed humidity and the rear section of the oblique honeycomb being used as a condensing section to dehumidify the air to a prescribed humidity and obtain condensed water, the method comprising a humidifying step of humidifying the air containing chemical pollutants and adsorbing a part of the chemical pollutants in the air into excess water in the humidifying section, thereby removing the chemical pollutants from the air, and a dehumidifying step of dehumidifying the air humidified in the humidifying step and adsorbing the chemical pollutants remaining without being removed in the humidifying step into the condensed water in the condensing section, thereby removing the chemical pollutants.

7. The method of cleaning air according to claim 1, wherein the water supplied to the oblique honeycomb is deionized water.

8. The method of cleaning air according to claim 3, wherein the water supplied to the oblique honeycomb to used as the humidifying means is city water or industrial water and the water supplied to the oblique honeycomb to used as the condensing means is deionized water.

9. The method of cleaning air according to claim 1, wherein the oblique honeycomb is fabricated using glass fiber, ceramic fiber, or alumina fiber base material containing one or more fillers or binders selected from the group consisting of alumina, silica, and titania.

10. The method of cleaning air according to any one of claims 3–6, wherein the clean air dehumidified in the dehumidifying step is heated to a prescribed temperature and used as air for a clean room.

11. An air cleaning device having a humidifying section comprising a first air inlet port, a first water supply means, a humidifying means to humidify air introduced from the first air inlet port using water supplied by the first water supply means, a first air discharge port to discharge the humidified air, and a first water discharge means to discharge water from the system and a condensing section comprising a second air inlet port provided linked with the first air inlet port, a second water supply means, a condensing means to condense water in the air introduced from the second air inlet port using water supplied by the second water supply means, a second air discharge port to discharge the air after condensation, and a second water discharge means to discharge condensed water from the system, wherein the humidifying means and condensing means are respectively composed of a oblique honeycomb with openings on the front and rear surfaces and on the upper and lower surfaces, each oblique honeycomb being arranged so that the front surface respectively faces the side of the first air inlet port or the second air inlet port, and the introduced air passes through each oblique honeycomb, and the first water supply means and the second water supply means are installed above the respective oblique honeycomb and wherein a temperature and humidity adjusting means is provided after the second water discharge means.

12. The air cleaning device according to claim 11, wherein the first air discharge port and the second air inlet port are integrally linked to perform the humidifying operation and condensing operation in one oblique honeycomb.

13. The air cleaning device according to claim 11, wherein the height of cells in the oblique honeycomb is 2.0–8.0 mm.

14. An air cleaning device according to claim 11, wherein the first water discharge means and the first water supply means are connected with a first circulating pump.

15. The air cleaning device according to claim 11, wherein the second water discharge means and the second water supply means are connected with a second circulating pump.

16. The air cleaning device according to claim 11, wherein a recycle water reservoir for adjusting the concentration of pollutants by means of overflow is provided in the lower part of either or both of the humidifying means and condensing means.

17. The air cleaning device according to claim 11, wherein the air discharger of the temperature and humidity adjusting means is communicated with the clean room.

* * * * *